United States Patent
Kim et al.

(10) Patent No.: US 7,925,014 B2
(45) Date of Patent: Apr. 12, 2011

(54) RANDOM NUMBER GENERATING, ENCRYPTING, AND DECRYPTING APPARATUS, METHOD THEREOF, PROGRAM THEREOF, AND RECORDING MEDIUM THEREOF

(75) Inventors: Song-Ju Kim, Tokyo (JP); Akio Hasegawa, Tokyo (JP); Ken Umeno, Tokyo (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 1070 days.

(21) Appl. No.: 10/545,857

(22) PCT Filed: Mar. 25, 2003

(86) PCT No.: PCT/JP03/03595
§ 371 (c)(1),
(2), (4) Date: Feb. 6, 2006

(87) PCT Pub. No.: WO2004/086673
PCT Pub. Date: Oct. 7, 2004

(65) Prior Publication Data
US 2006/0159267 A1    Jul. 20, 2006

(51) Int. Cl.
*H04L 9/00* (2006.01)
(52) U.S. Cl. ............ 380/46; 380/260; 708/251
(58) Field of Classification Search .......... 380/46, 380/260; 708/250, 251
See application file for complete search history.

(56) References Cited

U.S. PATENT DOCUMENTS
2003/0076956 A1 * 4/2003 Shackleford et al. ......... 380/263

OTHER PUBLICATIONS
M. Tomassini and M. Perrenoud. Cryptography and cellular automata, Applied Soft Computing, vol. 1, 2001, pp. 151-160.*
Bardell, P.H. Analysis of cellular automata used as psuedorandom patterngenerators. Test Conference, 1990. Proceedings., International. 762-768.*
M. Sipper and E Ruppin, "Co-evolving Cellular Architectures by Cellular Programming", IEEE, 1996, pp. 306-311.*
Nandi et al., "Theory and Applications of Cellular Autmata in Cryptography," IEEE Transactions on Computers, Dec. 1994, vol. 43, No. 12, pp. 1346-1357, especially VI. Stream Cipher Strategy.

(Continued)

*Primary Examiner* — Gilberto Barron, Jr.
*Assistant Examiner* — Virginia Ho
(74) *Attorney, Agent, or Firm* — K&L Gates LLP

(57) ABSTRACT

Random number generating, encrypting, and decrypting apparatus, method thereof, program thereof, and recording medium thereof are provided.
Random numbers for cryptographic applications are generated by a CA core. The CA core is composed of one-dimensional, two-state, and three-neighbor cell automaton. A total of three inputs for the own cell and both neighbor cells are input to each cell. Each cell performs a logical operation and outputs the result of the logical operation. Each cell contains a register. Each register captures the result of the logical operation in synchronization with a clock and stores the result. An output of a cell is fed back to the cell to perform an arithmetic calculation at the next time step. In this case, a rotation shift operation of which outputs of cells are shifted to the left and fed back to the cells is performed. To output random numbers having many bits, 40 bits of outputs of cells are selected. The selected cell numbers are not increased at fixed intervals, but increasing intervals.

26 Claims, 9 Drawing Sheets

OTHER PUBLICATIONS

Mihaljevic et al., "An Improved Key Stream Generator Based on the Programable Cellular Automata. Lecture Notes in Computer Science," Nov. 1997, Vo. 1334, pp. 181-191, especially 3 A Novel PCA Based Key Stream Generator.

Mihaljevic et al., A Family of Fast Keystream Generators Based on Programable Linear Cellular Automata over GF (q) and Time-Variant Table. IEICE Transactions on Fundamentals of Electronics, Communications and Computer Science, Jan. 25, 1999, vol. E82-A, No. 1, pp. 32-91, especially 3.2 The Generator Algorithm.

Stephen Wolfram, Publications by Stephen Wolfram, http://www.stephenwolfram.com/publications/articles/ca/85-cryptography/index.html., Cryptography with Cellular Automata (1986), 4 pages.

Stephen Wolfram, Publications by Stephen Wolfram, http://www.stephenwolfram.com/publications/articles/ca/85-random/index.html., Random Sequence Generation by Cellular Automata (1986), 48 pages.

* cited by examiner

Fig. 1A - PRIOR ART
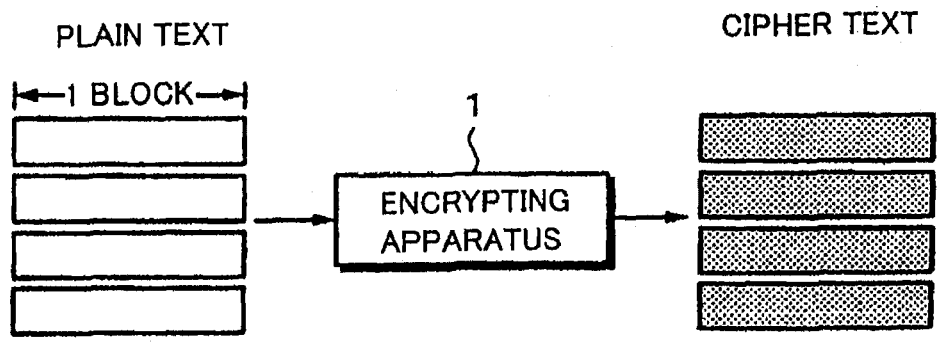
Fig. 1B - PRIOR ART
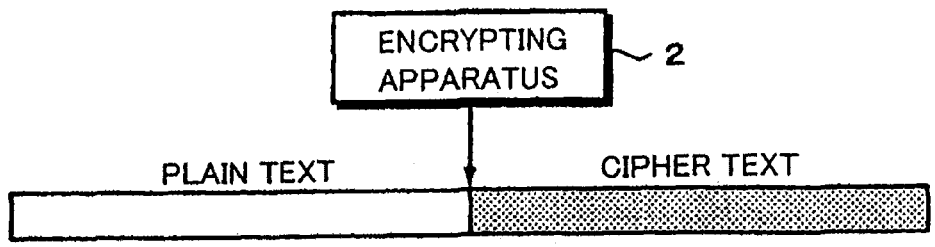
Fig. 2 - PRIOR ART
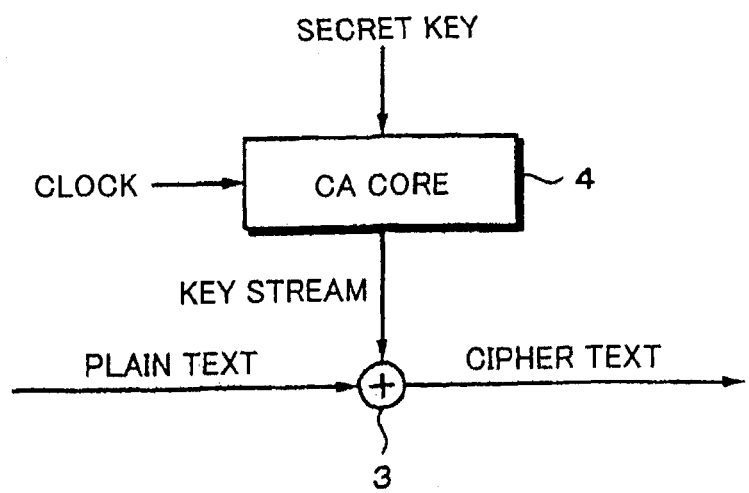

Fig. 3
- PRIOR ART

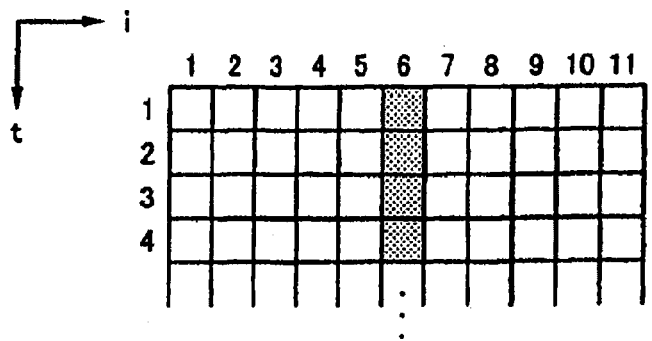

Fig. 4

| NUMBER | TEST NAME |
|---|---|
| 1 | Frequency |
| 2 | Block Frequency |
| 3 | Runs |
| 4 | Longest Run |
| 5 | Binary Matrix Rank |
| 6 | Discrete Fourier Transform |
| 7 | Non-overlapping Template Matching |
| 8 | Overlapping Template Matching |
| 9 | Universal |
| 10 | Lempel Ziv Compression |
| 11 | Linear Complexity |
| 12 | Serial |
| 13 | Approximate Entropy |
| 14 | Cumulative Sums |
| 15 | Random Excursions |
| 16 | Random Excursions Variant |

Fig. 5

| TEST NAME | BLOCK LENGTH |
|---|---|
| Block Frequency | 20,000 |
| Non-overlapping Template Matching | 9 |
| Overlapping Template Matching | 9 |
| Universal (Initialization Steps) | 7 (1280) |
| Linear Complexity | 500 |
| Serial | 10 |
| Approximate Entropy | 10 |

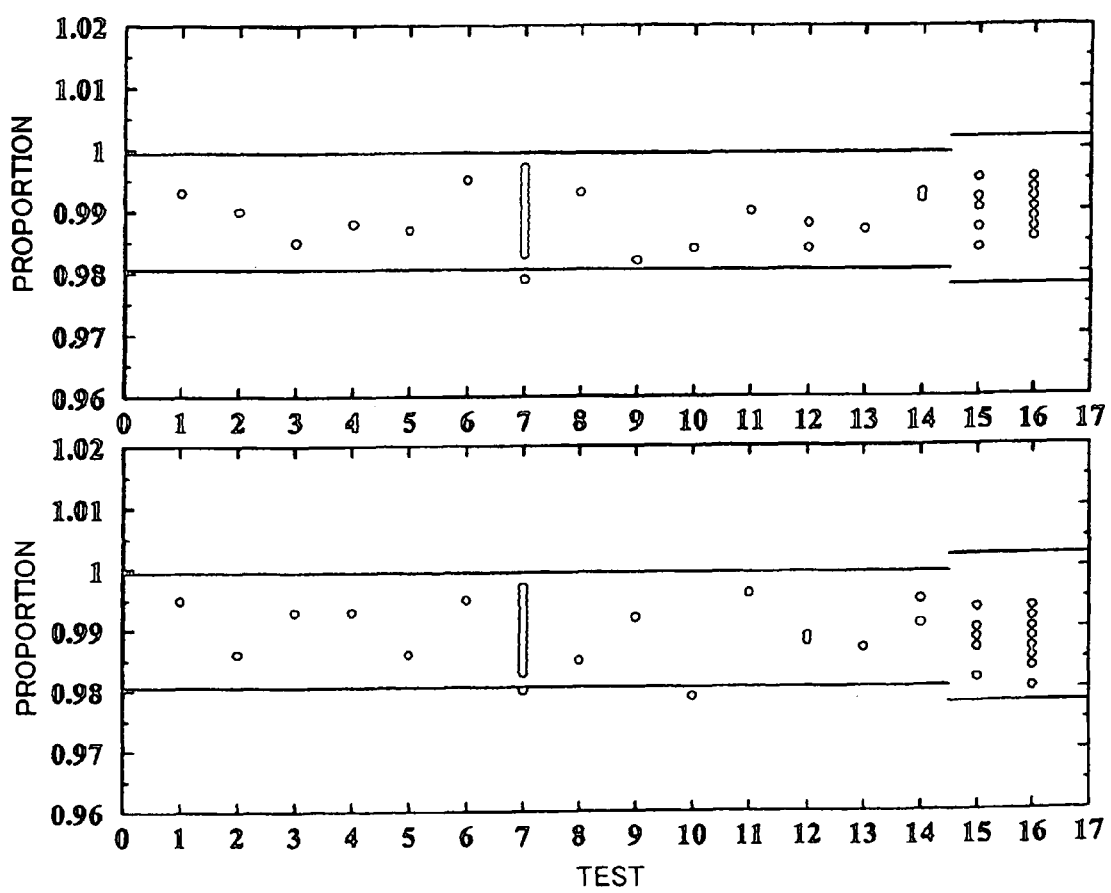

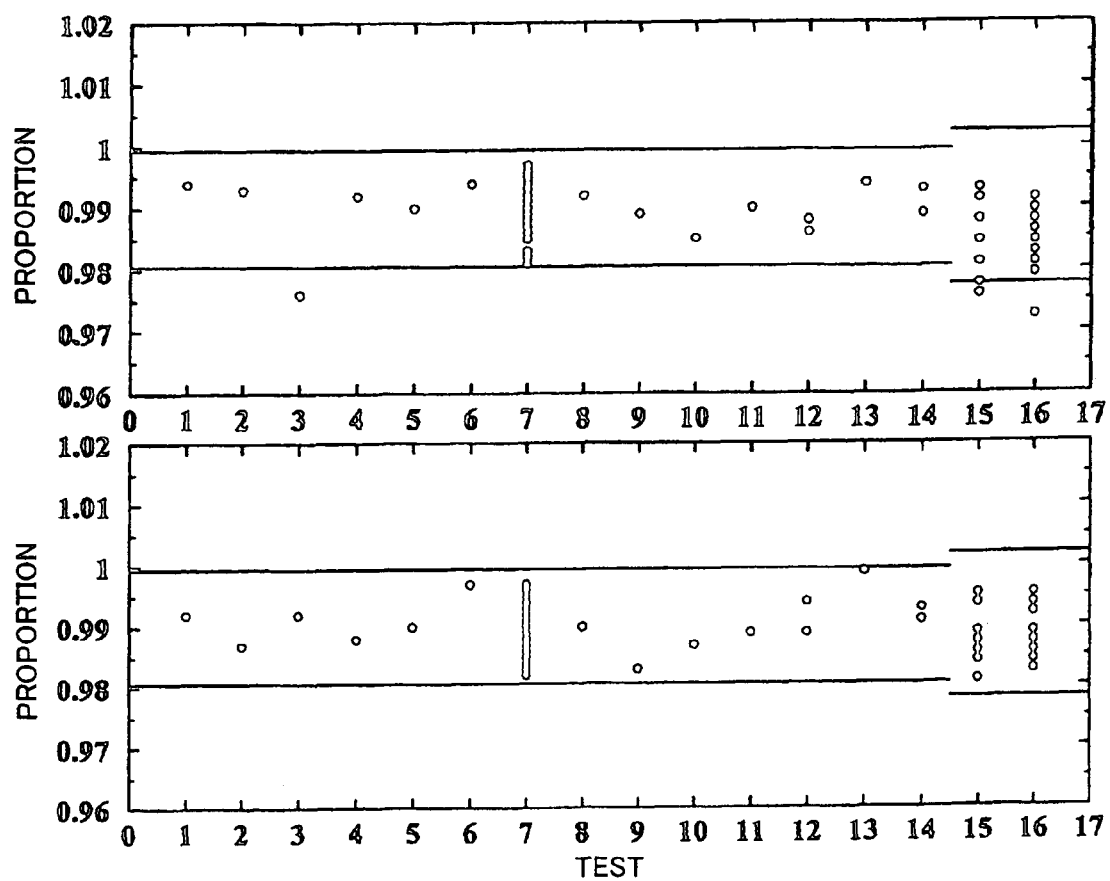

RANDOM NUMBER GENERATING, ENCRYPTING, AND DECRYPTING APPARATUS, METHOD THEREOF, PROGRAM THEREOF, AND RECORDING MEDIUM THEREOF

BACKGROUND

The present invention relates to a random number generating, encrypting, and decrypting apparatus, a method thereof, a program thereof, and a recording program thereof.

In recent years, as the Internet and mobile communication have been more widely used, the importance of protection of digital information has become stronger. As a cryptographic technology, the common key system that uses the same secret key for an encrypting process and a decrypting process is known. The common key system is categorized as block cipher and stream cipher.

FIG. 1A describes the block cipher. Information bit sequence of plain text is divided by a predetermined length (into blocks). An encrypting apparatus 1 encrypts each block. Likewise, cipher text is divided into blocks.

On the other hand, as shown in FIG. 1B, in the stream cipher, random numbers generated by an encrypting apparatus (random number generator) 2 are operated on an information bit sequence bit by bit so as to generate cipher text.

In the stream cipher, when bit sequences of plain text are denoted by m1, m2, m3, . . . and so forth, bit sequences of random numbers are denoted by r1, r2, r3, . . . and so forth, and bit sequences of cipher text are denoted by c1, c2, c3, . . . and so forth, the encrypting process is performed by ci=mi ⊕68 ri (where ⊕ represents an operation of mod. 2; i=1, 2, 3, . . . and so forth). The decrypting process is performed by mi=ci⊕ri (where ⊕ represents an operation of mod. 2; i=1 2, 3, and so forth).

The transmission side and the reception side need to generate common random numbers. If random number sequences and random number generation patterns are known, they can be easily decrypted. Thus, safe cipher random numbers used for cryptographic applications need to be statistically uniform. In addition, future random number sequences need to be difficult to be estimated with past random number sequences.

Generally, the steam cipher is performed faster than the block cipher. When large amount of data such as video data are encrypted and transmitted in real time, the stream cipher is more suitable than the block cipher. In addition, the circuit scale for the stream cipher is often smaller than that for the block cipher. Thus, although block ciphers such as DES (Data Encryption Standard), AES (Advanced Encryption Standard), and so forth have been standardized, the stream ciphers have been widely used.

However, since RC4 ((Rivest Cipher) 4 Stream Cipher) that has been widely used has a weak key, disadvantage against the use of WEP (Wired Equivalent Privacy Protocol), and a bias of an output, it has been academically disputed on its safety. In addition, since RC4 was designed for software, its encryption speed has a restriction. Thus, it can be said that safe and high speed stream cipher dedicated for hardware is needed.

On the other hand, in recent years, cryptographic algorithm that uses chaos, which has been studied in the field of non-linear dynamics, has been widely studied. However, most of these studies are based on mapping dynamical systems. In contrast, cryptographic algorithms that use cell automaton (referred to as CA) whose state, time, and space are all discrete dynamical systems, are not widely known. The CA is suitable to be embedded in hardware because of its structure. The CA is expected to accomplish high speed stream cipher. Stephen Wolfram has proposed a stream cipher using rule 30 of one-dimensional, two-state, three-neighbor cell automaton in "Adv. Appl. Math. Vol. 7 (1986) 123-169," "Lecture Notes in Computer Science Vol. 218 (1986) 429-432," and so forth.

FIG. 2 shows the structure of cryptographic algorithm using CA. Input information data (plain text) are input as a one-bit stream to an exclusive OR circuit (hereinafter sometimes referred to as EX-OR gate) 3. A key stream that is a one-bit stream is input from a CA core 4 (random number generator) to an other input of the EX-OR gate 3. The EX-OR gate 3 outputs cipher text. A secret key and a clock are input as initial values to the CA core 4. The CA core 4 generates random numbers.

The one-dimensional, two-state, three-neighbor cell automaton represents that cells are arranged on a one-dimensional lattice, that each cell has a state value that is 0 or 1, that the state value of each cell at the next time (hereinafter sometimes referred to as time step) is given by a function (rule) that depends on only the state value of the own cell and the state values of both neighbors, and that the state value of each cell is synchronously updated by the function. In other words, the state value of each cell is expressed by the following formula (1).

$$S_i^{t+1} = F(S_{i-1}^t, S_i^t, S_{i+1}^t) \quad (1)$$

where S with i and t represents the state of i-th cell at time step t.

Stephen Wolfram searches for a rule that generates a random sequence in the range of the one-dimensional, two-state, and three-neighbor CA and shows that the rule 30 is the best pseudo random generator. The state update rule of the rule 30 can be expressed by the following formula (2).

$$S_i^{t+1} = S_{i-1}^t \oplus S_i^t \oplus S_{i+1}^t \oplus S_i^t \cdot S_{i+1}^t \quad (2)$$

where ⊕ represents an addition of mod. 2.

Formula (2) can be represented in Booleans algebra by the following formula (3).

$$S_i^{t+1} = S_{i-1}^t \, XOR(S_i^t \, OR \, S_{i+1}^t) \quad (3)$$

FIG. 3 is a schematic diagram showing cells arranged in coordinates whose vertical axis represents time (t) and whose horizontal axis represents cell numbers (i). In FIG. 3, the state of the shaded i-th cell, for example, the sixth cell, is used as a key stream.

Stephen Wolfram conducted statistic tests for seven types of bit sequences that the CA rule generates and checked whether they have randomness. However, he only checked randomness of several bit sequences. Thus, the evaluation results for a pseudo random number generator that he conducted is not sufficient.

As a random number evaluation test for cryptographic applications, NIST (National Institute of Standards and Technology) has disclosed RNG testing to the public (NIST Special Publication (SP) 800-22, A Statistical Test Suite for Random and Pseudo random Number Generators for Cryptographic Applications). FIG. 4 shows NIST's 16 types of test items.

In the NIST's test, p-value of an n-bit sequence is obtained. p-value is the possibility of which a logically perfect random sequence generator generates a bit sequence having lower randomness than the input n-bit sequence. In this case, "lower randomness" means that the characteristic quantity under test deviates from the mean value.

When the obtained p-value is equal to or larger than α, this state is referred to as "success." This evaluation is performed for m samples. The success rate and the uniformity of p-value are evaluated. When p-value is uniform and the success rate is in a predetermined range whose center value is 1-α, this state is referred to as "the test is "passed." Test results vary slightly depending on an initial value (a secret key given to the CA core). Thus, each test is performed with several initial values. In the following example, tests are performed with n=$10^6$, α=0.01, and m=1000. FIG. 5 shows parameters used in each test.

FIG. 6 shows test results of RC4 (256-bit key). FIG. 7 shows test results of the CA rule 30. Each graph shows two test results obtained with different initial values. In the graphs that show the test results, the horizontal axis represents test types and the vertical axis represents success rates. The region surrounded by upper and lower lines represents a pass region. In the CA, a cell number is fixed and a bit sequence is chronologically sampled. The number of cells is for example 1000.

As is clear from FIG. 6, in the RC4, the uniformity of p-value of all tests is passed. In one template of the seventh test item (Non-overlapping Template Matching Test), the success rate always deviates from the range. In the seventh test, with 148 types of templates, pattern matching is performed. The success rate of each type is calculated. Depending on an initial value, the success rate of the tenth test item (Lempel Ziv Compression) deviates from the pass range. Thus, in the RC4, several tests are not passed.

As is clear from FIG. 7, in the CA rule 30, depending on an initial value, the third test item (Runs Test), the fifteenth test item (Random Excursions), and the sixteenth test item (Random Excursions Variant) are not passed. More seriously, the uniformity of p-value of the tenth test item (Lempel Ziv Compression) is lost. This means that characteristics of bit sequences are biased. Thus, there is a possibility of which bit sequences can be distinguished from random sequences.

Since only one bit of information is used at one time step, even if the number of cells (gates) is increased, the cryptographic process speed cannot be increased.

SUMMARY

The present invention provides a random number generating, encrypting, and decrypting apparatus, a method thereof, a program thereof, and a recording medium thereof that allow all tests of the CA to be passed, have excellent randomness, and increase cryptographic process speed.

The present invention in an embodiment is a random number generating apparatus that uses a one-dimensional, two-state, and K-neighbor cell automaton having a plurality of cells one-dimensionally arranged, each cell having a state value that is 0 or 1, the state value of each cell at next time being given by a rule that depends on only the state value of the own cell and the state values of neighbor cells, the state value of each cell being updated according to the rule, the apparatus comprising:

a path that outputs an output of at least one of the plurality of cells and feeds back outputs of the plurality of cells to inputs of the plurality of cells at the current time so as to update the state values of the plurality of cells at the next time; and shift process means, disposed in the path, for shifting outputs of the plurality of cells for a predetermined number of cells.

The present invention in an embodiment is a random number generating method using a one-dimensional, two-state, and K-neighbor cell automaton having a plurality of cells, each cell having a state value that is 0 or 1, the state value of each cell at next time being given by a rule that depends on only the state value of the own cell and the state values of neighbor cells, the state value of each cell being updated according to the rule, the random number generating method comprising the step of:

when an output of at least one of the plurality of cells is output and outputs of the plurality of cells are fed back to inputs of the plurality of cells at the current time so as to update the state values of the plurality of cells at the next time, shifting outputs of the plurality of cells for a predetermined number of cells.

The present invention in an embodiment is a program that causes a computer to execute a random number generating method using a one-dimensional, two-state, and K-neighbor cell automaton having a plurality of cells, each cell having a state value that is 0 or 1, the state value of each cell at next time being given by a rule that depends on only the state value of the own cell and the state values of neighbor cells, the state value of each cell being updated according to the rule, the random number generating method comprising the step of:

when an output of at least one of the plurality of cells is output and outputs of the plurality of cells are fed back to inputs of the plurality of cells at the current time so as to update the state values of the plurality of cells at the next time, shifting outputs of the plurality of cells for a predetermined number of cells.

The present invention in an embodiment is a computer readable recording medium on which a program that causes a computer to execute the random number generating method has been recorded.

The present invention in an embodiment is an encrypting apparatus that exclusively ORing plain text and a random number and generates cipher text, comprising:

a random number generating device that generates the random number, the random number generating device using a one-dimensional, two-state, and K-neighbor cell automaton having a plurality of cells one-dimensionally arranged, each cell having a state value that is 0 or 1, the state value of each cell at next time being given by a rule that depends on only the state value of the own cell and the state values of neighbor cells, the state value of each cell being updated according to the rule;

a path that outputs an output of at least one of the plurality of cells and feeds back outputs of the plurality of cells to inputs of the plurality of cells at the current time so as to update the state values of the plurality of cells at the next time; and shift process means, disposed in the path, for shifting outputs of the plurality of cells for a predetermined number of cells.

The present invention in an embodiment is an encrypting method of exclusively ORing plain text and a random number and generating cipher text, comprising the steps of:

generating the random number, the random number generating device using a one-dimensional, two-state, and K-neighbor cell automaton having a plurality of cells, each cell having a state value that is 0 or 1, the state value of each cell at next time being given by a rule that depends on only the state value of the own cell and the state values of neighbor cells, the state value of each cell being updated according to the rule; and when an output of at least one of the plurality of cells is output and outputs of the plurality of cells are fed back to inputs of the plurality of cells at the current time so as to update the state values of the plurality of cells at the next time, shifting outputs of the plurality of cells for a predetermined number of cells.

The present invention in an embodiment is a program that causes a computer to execute an encrypting method of exclusively ORing plain text and a random number and generating cipher text, the encrypting method comprising the steps of:

generating the random number, the random number generating device using a one-dimensional, two-state, and K-neighbor cell automaton having a plurality of cells, each cell having a state value that is 0 or 1, the state value of each cell at next time being given by a rule that depends on only the state value of the own cell and the state values of neighbor cells, the state value of each cell being updated according to the rule; and when an output of at least one of the plurality of cells is output and outputs of the plurality of cells are fed back to inputs of the plurality of cells at the current time so as to update the state values of the plurality of cells at the next time, shifting outputs of the plurality of cells for a predetermined number of cells.

The present invention in an embodiment is a computer readable recording medium on which a program that causes a computer to execute the encrypting method has been recorded.

The present invention in an embodiment is a decrypting apparatus that exclusively ORing cipher text and a random number and decrypting cipher text, comprising:

a random number generating device that generates the random number, the random number generating device using a one-dimensional, two-state, and K-neighbor cell automaton having a plurality of cells one-dimensionally arranged, each cell having a state value that is 0 or 1, the state value of each cell at next time being given by a rule that depends on only the state value of the own cell and the state values of neighbor cells, the state value of each cell being updated according to the rule;

a path that outputs an output of at least one of the plurality of cells and feeds back outputs of the plurality of cells to inputs of the plurality of cells at the current time so as to update the state values of the plurality of cells at the next time; and shift process means, disposed in the path, for shifting outputs of the plurality of cells for a predetermined number of cells.

The present invention in an embodiment is a decrypting method of exclusively ORing cipher text and a random number and decrypting cipher text, comprising the steps of:

generating the random number, the random number generating device using a one-dimensional, two-state, and K-neighbor cell automaton having a plurality of cells, each cell having a state value that is 0 or 1, the state value of each cell at next time being given by a rule that depends on only the state value of the own cell and the state values of neighbor cells, the state value of each cell being updated according to the rule; and when an output of at least one of the plurality of cells is output and outputs of the plurality of cells are fed back to inputs of the plurality of cells at the current time so as to update the state values of the plurality of cells at the next time, shifting outputs of the plurality of cells for a predetermined number of cells.

The present invention in an embodiment is a program that causes a computer to execute a decrypting method of exclusively ORing cipher text and a random number and decrypting cipher text, the decrypting method comprising the steps of:

generating the random number, the random number generating device using a one-dimensional, two-state, and K-neighbor cell automaton having a plurality of cells, each cell having a state value that is 0 or 1, the state value of each cell at next time being given by a rule that depends on only the state value of the own cell and the state values of neighbor cells, the state value of each cell being updated according to the rule; and when an output of at least one of the plurality of cells is output and outputs of the plurality of cells are fed back to inputs of the plurality of cells at the current time so as to update the state values of the plurality of cells at the next time, shifting outputs of the plurality of cells for a predetermined number of cells.

The present invention in an embodiment is a computer readable recording medium on which a program that causes a computer to execute the decrypting method has been recorded.

Additional features and advantages of the present invention are described in, and will be apparent from, the following Detailed Description and the figures.

BRIEF DESCRIPTION OF THE FIGURES

FIGS. 1A and 1B is a schematic diagram briefly describing conventional block cipher and stream cipher.

FIG. 2 is a block diagram showing the structure of an encrypting apparatus using a conventional CA.

FIG. 3 is a schematic diagram describing a key stream in the encrypting apparatus using the conventional CA.

FIG. 4 is a schematic diagram showing an example of test items of a statistic test that evaluates random numbers for cryptographic applications.

FIG. 5 is a schematic diagram showing an example of parameters of a statistic test that evaluates random numbers for cryptographic applications.

FIG. 6 is a schematic diagram showing two examples of results of statistic tests of RC4 as conventional stream cipher.

FIG. 7 is a schematic diagram showing two examples of results of statistic tests for cryptographic applications using the conventional CA.

DETAILED DESCRIPTION

Figure 8A:
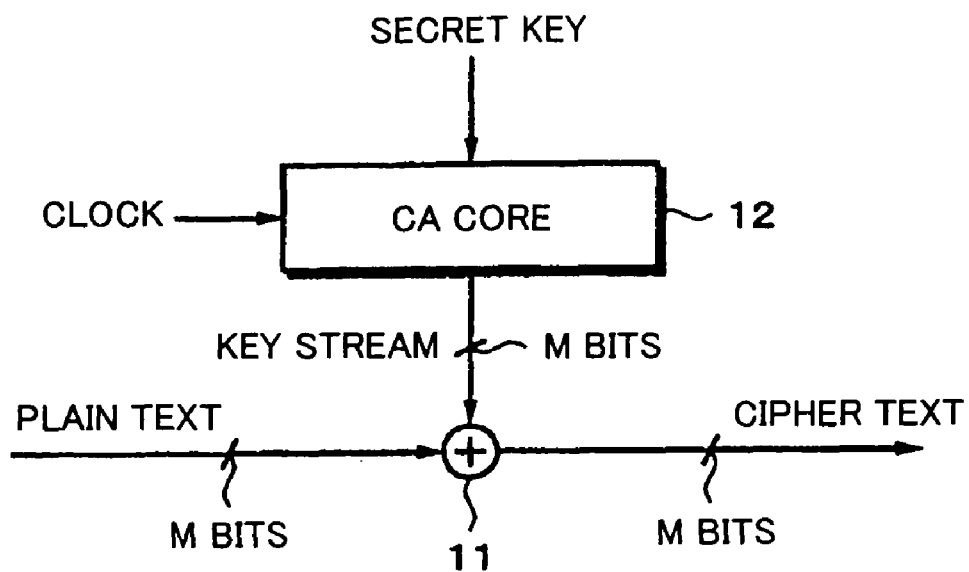
FIGS. 8A and 8B is a block diagram showing a basic structure of the encrypting apparatus according to an embodiment of the present invention.
Figure 8B:
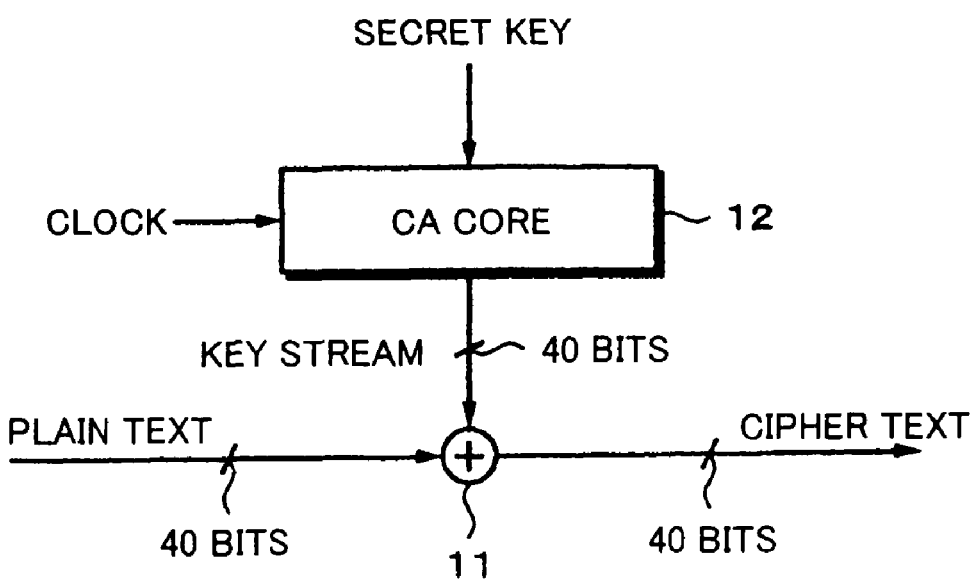

FIG. 8A shows the basic structure of the present invention. Input information data (plain text) are converted into M-bit parallel data and input to an EX-OR gate 11. A key stream of M-bit parallel data is input from a CA core 12 to another input of the EX-OR gate 11. The EX-OR gate 11 outputs cipher text. Data of a secret key and a clock are input as initial values to the CA core 12. As a result, the CA core 12 generates 40-bit parallel random number data (key stream). FIG. 8B shows an embodiment in the case of M=40. The CA core 12 has the structure of the one-dimensional, two-state, and three-neighbor cell automaton. The CA core 12 updates states according to the rule 30 as expressed by formula (2) or formula (3).

A decrypting apparatus (not shown) has the same structure as the foregoing encrypting apparatus. In other words, cipher text is supplied to an EX-OR gate. A key stream is supplied to the EX-OR gate. As a result, the decrypting apparatus performs a decrypting process. When the encrypting apparatus and the decrypting apparatus use common initial values and synchronize with each other, they can use a common key.

Figure 9:
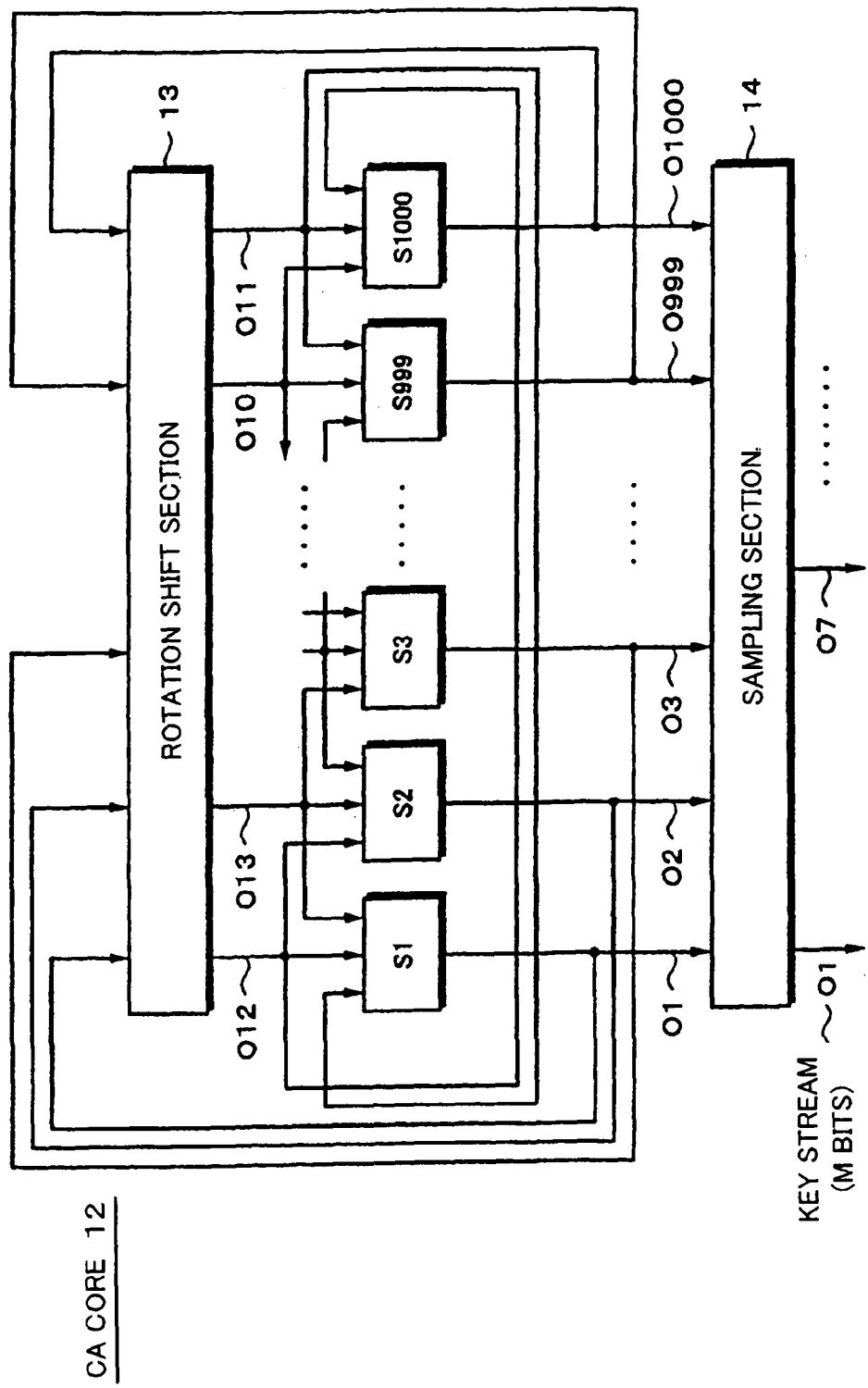
FIG. 9 is a block diagram showing the encrypting apparatus according to an embodiment of the present invention.

FIG. 9 shows an example of the structure of the CA core 12 according to an embodiment (three-neighbor CA, 1000 cells). S1, S2, S3, . . . , S999, and S1000 represent first to 1000th cells. Three inputs of an own cell and both neighbor cells are supplied to each cell. As the left neighbor cell for the first cell S1, an input to the cell S1000 is used. As the right neighbor cell for the 1000th cell S1000, an input to the cell S1 is used. Each cell performs a logical operation expressed by formula (2) or formula (3) and outputs a logical operation result, one of O1 to O1000.

The cells S1 to S1000 each have a register. Each register successively captures a logical operation result in synchronization with a clock (not shown) and stores it. When the cells S1 to S1000 output logical operation results at some time step t, their registers capture logical operation results at the next time step t+1.

The outputs O1 to O1000 of the cells S1 to S1000 are fed back to the cells S1 to S1000 to calculate logical operation results at the next time step, respectively. In this case, a rotation shift section 13 performs a rotation shift operation. The rotation shift section 13 shifts the outputs O1 to O1000 leftward and feeds back them to the cells. For example, the rotation shift section 13 shifts outputs for 11 cells. In this case, the output O12 is input to the leftmost cell S1. The output O13 is input to the second leftmost cell S2. Likewise, outputs are shifted for 11 cells and fed back. The outputs O1 to O11 on the left of the cell S1 are input to 11 cells S990 to S1000 on the right of the cell S1, respectively.

The rotation shift is performed on the left of the drawing. Instead, the rotation shift may be performed on the right of the drawing. The number of outputs shifted does not need to be changed after they have been set. Thus, the rotation shift section 13 may be formed by connecting lines. However, the rotation shift section 13 may be formed of a switching circuit so that the number of outputs shifted can be changed.

One of the outputs O1 to O1000 of the cells S1 to S1000 may be selected as a one-bit key stream and used as an cipher key. According to the embodiment, the outputs O1 to O1000 of the cells S1 to S1000 are supplied to a sampling section 14 to output a multi-bit key stream. The sampling section 14 selects M bits of the outputs O1 to O1000 as a key stream. Cell numbers that are sampled are not at fixed intervals, but at increasing intervals. When N=1000 and M=40, cell numbers are increased to 1, 7, 14, 22, 31, 41, 52, 64, . . . , and 976 with an increment by 1.

Generally, n-th (n>1) cell number a(n) is expressed by the following formula (4). In the foregoing example, parameters a and d of formula (4) are a (1)=1 and d=6.

$$a(n) = a(1) + \sum_{m=1}^{n-1}(d + m - 1) \quad (4)$$

Since the sampling method does not need to be changed after it has been set, the sampling section 14 may be formed by setting only valid output lines. However, the sampling section 14 may be formed of a switching circuit so that the setting of the sampling method can be changed. Although the cell numbers are sampled at increasing intervals, they may be sampled at decreasing intervals. Instead, cell intervals may be varied at random.

Figure 10:
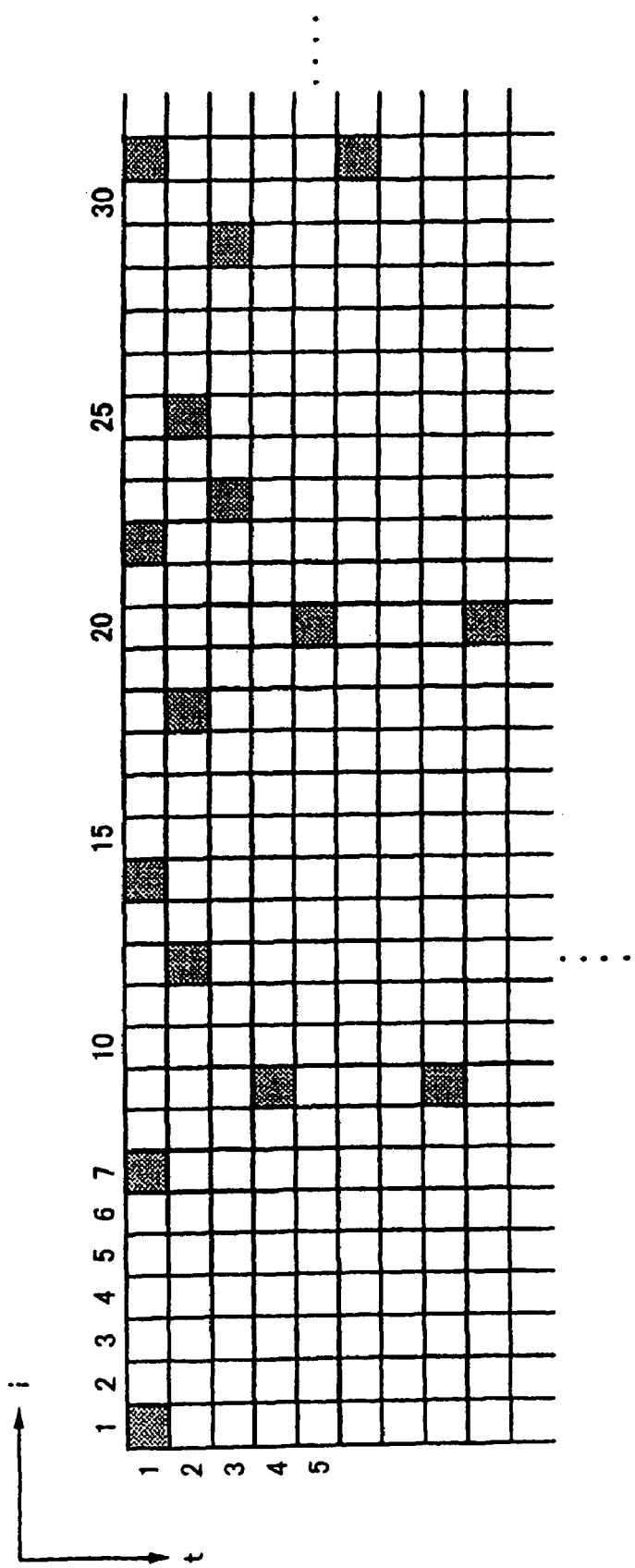
FIG. 10 is a schematic diagram describing a key stream in the encrypting apparatus according to the embodiment of the present invention.

FIG. 10 shows a key stream that is output from the sampling section 14 according to the embodiment of the present invention. At the first time step (t=1), viewed from the original CA, cell numbers 1, 7, 14, 22, 31, . . . , and so forth are selected and output as a key stream. Since the rotation shift process is performed for these cells, at the next time step (t=2), viewed from the original CA, cell numbers 12, 18, 25, 33, . . . , and so forth are selected and output as a key stream.

Figure 11:
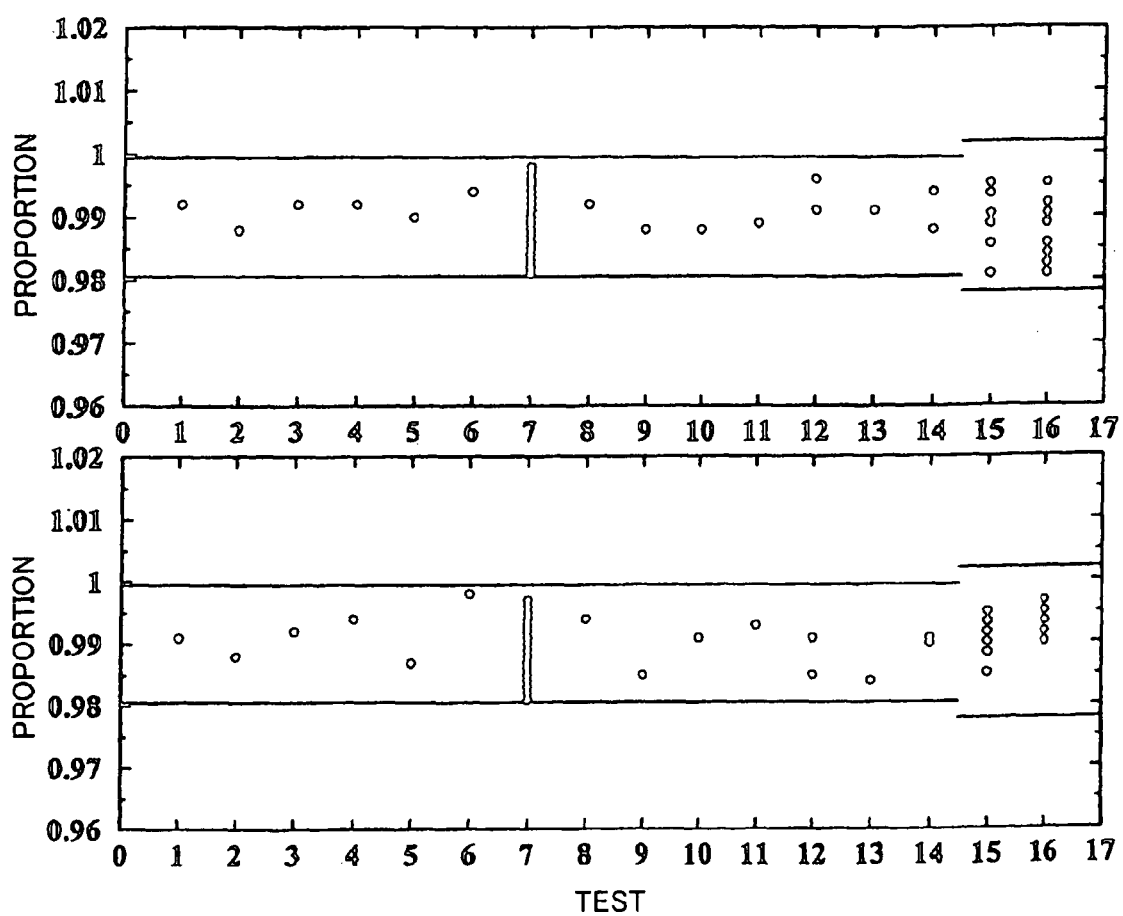
FIG. 11 is a schematic diagram showing two examples of results of statistic tests that performs a rotation shift according to the embodiment of the present invention.
Figure 12:
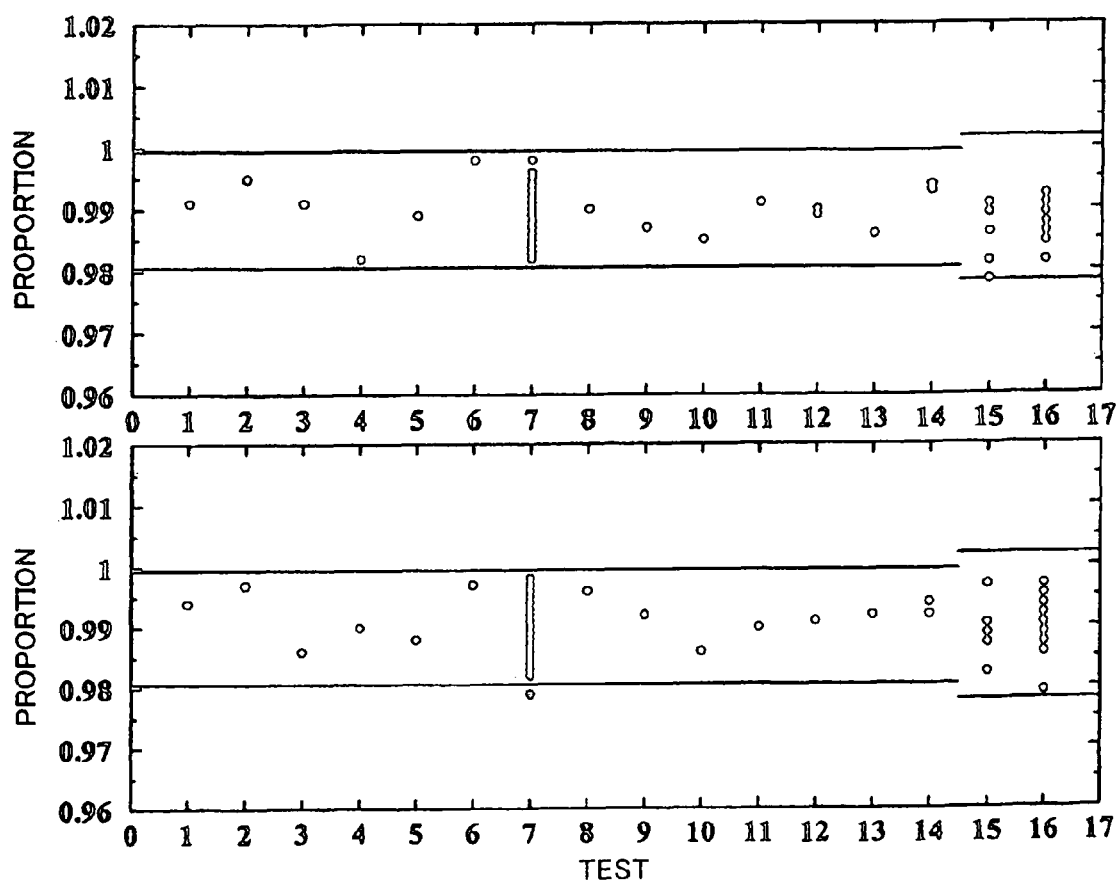
FIG. 12 is a schematic diagram showing two examples of results of statistic tests according to the embodiment of the present invention.

FIG. 11 shows results of an NIST's test in the case that the apparatus according to the foregoing embodiment has only the rotation shift section 13, not the sampling section 14. FIG. 12 shows results of an NIST's test in the case that the apparatus according to the foregoing embodiment has both the rotation shift section 13 and the sampling section 14.

As is clear from the test results (FIG. 11) in the case that the number of output shifted is 11, all 16 types of tests can be passed with two initial values.

When the number of cells is 1000 and information of 40 cells are sampled, depending on initial values, only one pattern of the seventh test (Non-overlapping Template Matching Test) is not passed. Thus, most of them are passed.

When the CA rule 30 having 1000 cells (the number of outputs shifted is 11 cells) is implemented to an FPGA (Field Programming Gate Array: Large scaled PLD (Programmable logic Device), results of (number of gates=14699, maximum operation frequency=105.831 MHz, and encryption (decryption) speed=4.233 Gbps) was obtained. When digital video data were encrypted and decrypted in real time, around 1 Gbps encryption (decryption) speed was accomplished at a clock frequency of 27 MHz.

According to the present invention, randomness can be more improved than that of the proposed RC4 and rule 30. In addition, since random numbers having many bits can be obtained without losing security, the encryption speed can be increased. In addition, since the circuit structure is simple, the maximum operation frequency can be increased. In other words, hardware that processes a large amount of information at high speed can be accomplished.

The present invention is not limited to the foregoing embodiment. In other words, without departing from the scope and spirit, various modification and ramifications of the present invention may be made. For example, according to the present invention, one-dimensional, two-state, and K-neighbor cell automaton that depends on state values of K cells may be used. In addition, the random number generator according to the present invention may be applied to the Monte Carlo method besides stream cipher.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A random number generating apparatus that uses a one-dimensional, two-state, and K-neighbor cell automaton having a plurality of cells one-dimensionally arranged, each cell having a state value that is 0 or 1, the state value of each cell at next time being given by a rule that depends on only the state value of the own cell and the state values of neighbor cells, the state value of each cell being updated according to the rule, the random number generating apparatus comprising:
- a path that outputs an output of at least one of the plurality of cells and feeds back outputs of the plurality of cells to inputs of the plurality of cells at the current time so as to update the state values of the plurality of cells at the next time, the plurality of cells including inputs and outputs; and
- a switching circuit, disposed in the path, configured to:
  - (a) for a first key stream output, shift the output of each the cell by a first predetermined number of cells and feed the shifted outputs to inputs of other cells, the first predetermined number being at least two;
  - (b) after the first key stream is output, change the first predetermined number to a second predetermined number; and
  - (c) for a second key stream output, shift the output of each the cell by the second predetermined number of cells and feed the shifted outputs to inputs of other cells.

2. The random number generating apparatus of claim 1, wherein the one-dimensional, two-state, and K-neighbor cell automaton is a one-dimensional, two-state, three-neighbor cell automaton of which the state value of each cell at the next time is given by a rule that depends on only the state value of the own cell and the state values of both the neighbor cells and the state value of each cell is updated according to the rule.

3. The random number generating apparatus of claim 1, further comprising sampling means for:
  (a) selecting a predetermined number of cells from outputs of the plurality of cells; and
  (b) outputting the selected predetermined number of cells in parallel.

4. The random number generating apparatus of claim 3, wherein intervals of selected cells of the predetermined number of cells are incremented or decremented.

5. The random number generating apparatus of claim 1, wherein the feed back path and the switching circuit are accomplished on an integrated circuit.

6. A method of operating a random number generating apparatus that uses a one-dimensional, two-state, and K-neighbor cell automaton having a plurality of cells, each cell having a state value that is 0 or 1, the state value of each cell at next time being given by a rule that depends on only the state value of the own cell and the state values of neighbor cells, the state value of each cell being updated according to the rule, the plurality of cells including inputs and outputs the method comprising:
  when the outputs of each of the plurality of cells are fed back to inputs of other cells at the current time so as to update the state values of the plurality of cells at the next time:
  (a) for a first key stream output, shifting the output of each of the plurality of cells by a first predetermined number of cells and feeding the shifted outputs to inputs of other cells, the first predetermined number being at least two;
  (b) after the first key stream is output, changing the first predetermined number to a second predetermined number; and
  (c) for a second key stream output, shifting the output of each the cell by the second predetermined number of cells and feeding the shifted outputs to inputs of other cells.

7. The method of claim 6, wherein the one-dimensional, two-state, and K-neighbor cell automaton is a one-dimensional, two-state, three-neighbor cell automaton of which the state value of each cell at the next time is given by a rule that depends on only the state value of the own cell and the state values of both the neighbor cells and the state value of each cell is updated according to the rule.

8. The method of claim 6, which includes:
  (a) selecting a predetermined number of cells from outputs of the plurality of cells; and
  (b) outputting the selected predetermined number of cells in parallel.

9. The method of claim 6, which includes incrementing or decrementing intervals of selected cells of the predetermined number of cells.

10. A non-transitory computer readable recording medium on which a program that causes a computer to execute a random number generating method has been recorded, the program using a one-dimensional, two-state, and K-neighbor cell automaton having a plurality of cells, each cell having a state value that is 0 or 1, the state value of each cell at next time being given by a rule that depends on only the state value of the own cell and the state values of neighbor cells, the state value of each cell being updated according to the rule, the plurality of cells including inputs and outputs, the random number generating method comprising:
  when the outputs of each of the plurality of cells are fed back to inputs of other cells at the current time so as to update the state values of the plurality of cells at the next time:
  (a) for a first key stream output, shifting the output of each of the plurality of cells by a first predetermined number of cells and feeding the shifted outputs to inputs of other cells, the first predetermined number being at least two;
  (b) after the first key stream is output, changing the first predetermined number to a second predetermined number; and
  (c) for a second key stream output, shifting the output of each the cell by the second predetermined number of cells and feeding the shifted outputs to inputs of other cells.

11. An encrypting apparatus that: (a) exclusively ORs plain text and a random number; and (b) generates cipher text, the encrypting apparatus comprising:
  a random number generating device that generates the random number, the random number generating device using a one-dimensional, two-state, and K-neighbor cell automaton having a plurality of cells one-dimensionally arranged, each cell having a state value that is 0 or 1, the state value of each cell at next time being given by a rule that depends on only the state value of the own cell and the state values of neighbor cells, the state value of each cell being updated according to the rule;
  a path that outputs an output of at least one of the plurality of cells and feeds back outputs of the plurality of cells to inputs of the plurality of cells at the current time so as to update the state values of the plurality of cells at the next time, the plurality of cells including inputs and outputs; and
  a switching circuit, disposed in the path, configured to:
  (a) for a first key stream output, shift the output of each the cell by a first predetermined number of cells and feed the shifted outputs to inputs of other cells, the first predetermined number being at least two; and
  (b) after the first key stream is output, change the first predetermined number to a second predetermined number; and (c) for a second key stream output, shift the output of each the cell by the second predetermined number of cells and feed the shifted outputs to inputs of other cells.

12. The encrypting apparatus of claim 11, wherein the one-dimensional, two-state, and K-neighbor cell automaton is a one-dimensional, two-state, three-neighbor cell automaton of which the state value of each cell at the next time is given by a rule that depends on only the state value of the own cell and the state values of both the neighbor cells and the state value of each cell is updated according to the rule.

13. The encrypting apparatus of claim 12, further comprising sampling means for:
(a) selecting a predetermined number of cells from outputs of the plurality of cells; and
(b) outputting the selected predetermined number of cells in parallel.

14. The encrypting apparatus of claim 12, wherein intervals of selected cells of the predetermined number of cells are incremented or decremented.

15. The encrypting apparatus of claim 12, wherein the feed back path and the switching circuit are accomplished on an integrated circuit.

16. A method of operating an encrypting device by exclusively ORing plain text and a random number and generating cipher text, the method comprising:
generating the random number using a random number generating device using a one-dimensional, two-state, and K-neighbor cell automaton having a plurality of cells, each cell having a state value that is 0 or 1, the state value of each cell at next time being given by a rule that depends on only the state value of the own cell and the state values of neighbor cells, the state value of each cell being updated according to the rule, the plurality of cells including inputs and outputs;
when the outputs of each of the plurality of cells are fed back to inputs of other cells at the current time so as to update the state values of the plurality of cells at the next time:
(a) for a first key stream output, shifting the output of each of the plurality of cells by a first predetermined number of cells and feeding the shifted outputs to inputs of other cells, the first predetermined number being at least two;
(b) after the first key stream is output, changing the first predetermined number to a second predetermined number; and
(c) for a second key stream output, shifting the output of each the cell by the second predetermined number of cells and feeding the shifted outputs to inputs of other cells.

17. The method of claim 16, wherein the one-dimensional, two-state, and K-neighbor cell automaton is a one-dimensional, two-state, three-neighbor cell automaton of which the state value of each cell at the next time is given by a rule that depends on only the state value of the own cell and the state values of both the neighbor cells and the state value of each cell is updated according to the rule.

18. The method of claim 16, which includes:
(a) selecting a predetermined number of cells from outputs of the plurality of cells; and
(b) outputting the selected predetermined number of cells in parallel.

19. The method of claim 16, which includes incrementing or decrementing intervals of selected cells of the predetermined number of cells.

20. A non-transitory computer readable recording medium on which a program that causes a computer to execute an encrypting method of exclusively ORing plain text and a random number and generating cipher text has been recorded, the encrypting method comprising:
generating the random number using a random number generating device using a one-dimensional, two-state, and K-neighbor cell automaton having a plurality, of cells, each cell having a state value that is 0 or 1, the state value of each cell at next time being given by a rule that depends on only the state value of the own cell and the state values of neighbor cells, the state value of each cell being updated according to the rule, the plurality of cells including inputs and outputs; and
when the outputs of each of the plurality of cells are fed back to inputs of other cells at the current time so as to update the state values of the plurality of cells at the next time:
(a) for a first key stream output, shifting the output of each of the plurality of cells by a first predetermined number of cells and feeding the shifted outputs to inputs of other cells, the predetermined number being at least two;
(b) after the first key stream is output, changing the first predetermined number to a second predetermined number; and
(c) for a second key stream output, shifting the output of each the cell by the second predetermined number of cells and feeding the shifted outputs to inputs of other cells.

21. A decrypting apparatus that: (a) exclusively ORs cipher text and a random number; and decrypts the cipher text, the decrypting apparatus comprising:
a random number generating device that generates the random number, the random number generating device using a one-dimensional, two-state, and K-neighbor cell automaton having a plurality of cells one-dimensionally arranged, each cell having a state value that is 0 or 1, the state value of each cell at next time being given by a rule that depends on only the state value of the own cell and the state values of neighbor cells, the state value of each cell being updated according to the rule;
a path that outputs an output of at least one of the plurality of cells and feeds back outputs of the plurality of cells to inputs of the plurality of cells at the current time so as to update the state values of the plurality of cells at the next time, the plurality of cells including inputs and outputs; and
a switching circuit, disposed in the path, configured to:
(a) for a first key stream output, shift the output of each the cell by a first predetermined number of cells and feed the shifted outputs to inputs of other cells, the first predetermined number being at least two;
(b) after the first key stream is output, change the first predetermined number to a second predetermined number; and
(c) for a second key stream output, shift the output of each the cell by the second predetermined number of cells and feed the shifted outputs to inputs of other cells.

22. The decrypting apparatus of claim 21, wherein the one-dimensional, two-state, and K-neighbor cell automaton is a one-dimensional, two-state, three-neighbor cell automaton of which the state value of each cell at the next time is given by a rule that depends on only the state value of the own cell and the state values of both the neighbor cells and the state value of each cell is updated according to the rule.

23. The decrypting apparatus of claim 21, wherein the feed back path and the switching circuit are accomplished on an integrated circuit.

24. A method of operating a decrypting apparatus by exclusively ORing cipher text and a random number and decrypting cipher text, the method comprising:

generating the random number using a random number generating device using a one-dimensional, two-state, and K-neighbor cell automaton having a plurality of cells, each cell having a state value that is 0 or 1, the state value of each cell at next time being given by a rule that depends on only the state value of the own cell and the state values of neighbor cells, the state value of each cell being updated according to the rule, the plurality of cells including inputs and outputs; and when the outputs of each of the plurality of cells are fed back to inputs of other cells at the current time so as to update the state values of the plurality of cells at the next time:
  (a) for a first key stream output, shifting the output of each of the plurality of cells by a first predetermined number of cells and feeding the shifted outputs to inputs of other cells, the first predetermined number being at least two;
  (b) after the first key stream is output, changing the first predetermined number to a second predetermined number; and
  (c) for a second key stream output, shifting the output of each the cell by the second predetermined number of cells and feeding the shifted outputs to inputs of other cells.

25. The method of claim 24, wherein the one-dimensional, two-state, and K-neighbor cell automaton is a one-dimensional, two-state, three-neighbor cell automaton of which the state value of each cell at the next time is given by a rule that depends on only the state value of the own cell and the state values of both the neighbor cells and the state value of each cell is updated according to the rule.

26. A non-transitory computer readable recording medium on which a program that causes a computer to execute a decrypting method of exclusively ORing cipher text and a random number and decrypting cipher text has been recorded, the decrypting method comprising:

generating the random number using a random number generating device using a one-dimensional, two-state, and K-neighbor cell automaton having a plurality of cells, each cell having a state value that is 0 or 1, the state value of each cell at next time being given by a rule that depends on only the state value of the own cell and the state values of neighbor cells, the state value of each cell being updated according to the rule, the plurality of cells including inputs and outputs; and when the output and outputs of each of the plurality of cells are fed back to inputs of other cells at the current time so as to update the state values of the plurality of cells at the next time:
  (a) for a first key stream output, shifting the output of each of the plurality of cells by a first predetermined number of cells and feeding the shifted outputs to inputs of other cells, the first predetermined number being at least two;
  (b) after the first key stream is output, changing the first predetermined number to a second predetermined number; and
  (c) for a second key stream output, shifting the output of each the cell by the second predetermined number of cells and feeding the shifted outputs to inputs of other cells.

* * * * *